Oct. 9, 1928.
P. W. NEFF
1,687,139
TRANSMISSION OPERATING DEVICE
Filed May 8, 1926   3 Sheets-Sheet 1
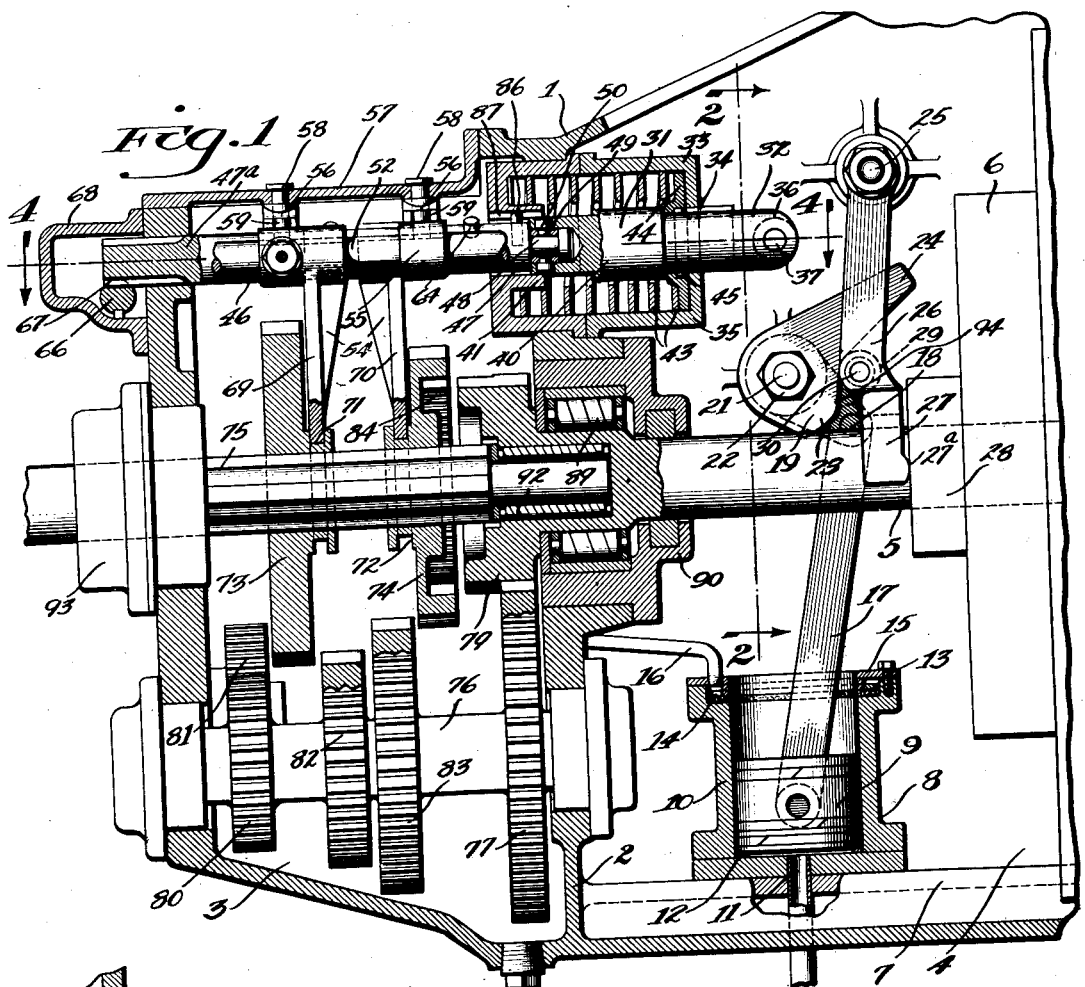
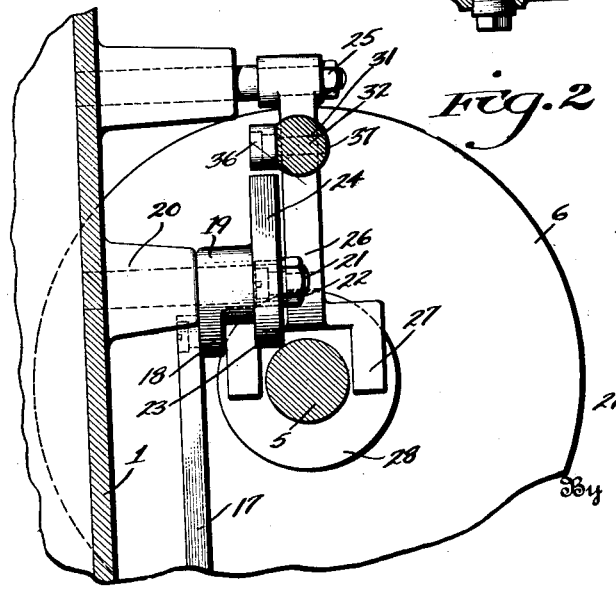
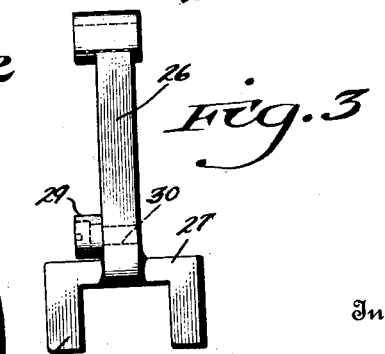
Inventor
Paul W. Neff.
By Ward-Ward
Attorneys Oct. 9, 1928.

P. W. NEFF 1,687,139

TRANSMISSION OPERATING DEVICE

Filed May 8, 1926   3 Sheets-Sheet 2

Inventor
Paul W. Neff.
By Word & Ward
Attorneys

Oct. 9, 1928.
P. W. NEFF
1,687,139
TRANSMISSION OPERATING DEVICE
Filed May 8, 1926  3 Sheets-Sheet 3
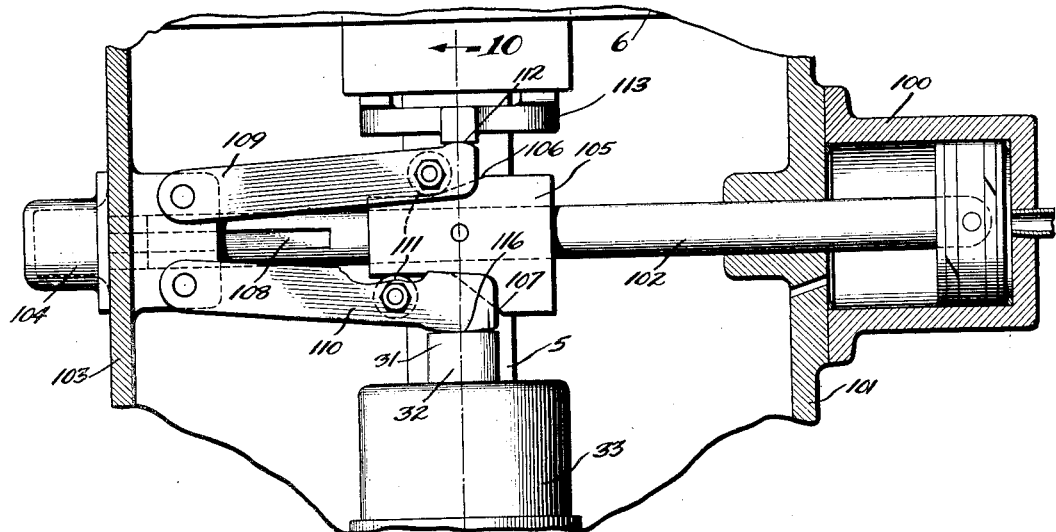
Fig. 9
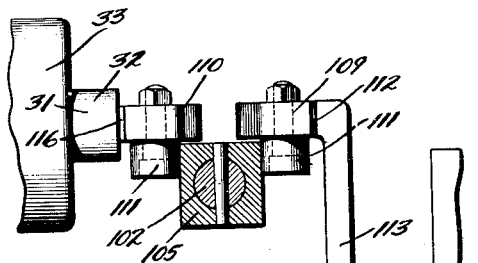
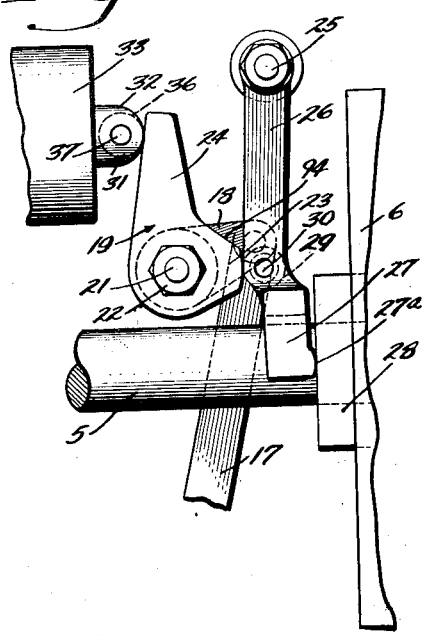
Fig. 8
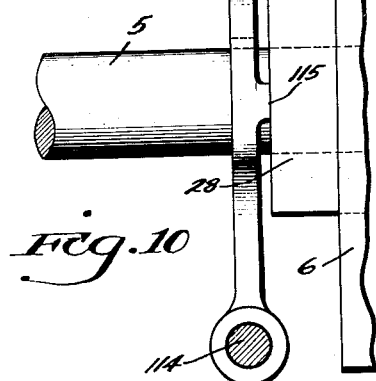
Fig. 10
Inventor
Paul W. Neff.
By Wood & Wood
Attorneys Patented Oct. 9, 1928.

1,687,139

UNITED STATES PATENT OFFICE.

PAUL W. NEFF, OF CINCINNATI, OHIO.

TRANSMISSION-OPERATING DEVICE.

Application filed May 8, 1926. Serial No. 107,801.

My invention relates generally to a slide gear transmission and its control wherein the selectivity of the slide gears for transmission or speed change control is manually effected, and the sliding and shifting of the gears into and out of transmission position, by power, in conjunction with the control of the clutch.

The clutch actuation and gear shifting follows in sequence; with the actuating mechanism thereof operated by power under fluid or pneumatic pressure, offering a definite, positive and powerful method for the clutch and slide gear shifting operations.

The herein described method of controlling the clutch for the throw-out, precedes the sliding of the gears, from a transmitting to a neutral position, and the order reversed for the throw-in control. The slide gears must be transferred to their neutral or inactive position before the selective control, or a speed change result, is possible.

Therefore, the object of the invention is the provision of a pneumatically operated clutch controlling and gear shifting means which will act quickly and smoothly and provide a common power source and mechanism for operating the clutch and shifting the slide gears.

Another object of this invention is to provide a pneumatically operated clutch actuating and gear shifting device which successively disengages the clutch and actuates a gear shifter for neutralizing the slide gears of a slide gear transmission and engages a selected gear when the power is released or on a return stroke of the actuating mechanism, and the shifter causes the selected gear to mesh with the proper gear in the train after which the clutch is engaged for a driving connection.

Another object is to provide a manual operated device for a selective control of the slide gears which is actuated independently of the power operated mechanisms for the clutch and gear shifting.

Another object is the provision of yieldable return of the slide gear shifter to bring the selected gear into mesh with its companion gear and therefore accommodate for any tooth end engagement of the gears, and permit the gears to be brought into intermesh as soon as the teeth are brought into registration.

Further objects and advantages will be more fully set forth in the description of the accompanying drawings forming a part of this specification, in which:

Figure 1 is a longitudinal sectional view taken longitudinally of the transmission case of an automobile showing the invention mounted therein.

Figure 2 is a sectional view taken on line 2—2 of Figure 1, showing the relation of the various clutch actuating and gear shifting members.

Figure 3 is a view of the clutch actuating lever removed from the transmission case.

Figure 8 is a view of a portion of Figure 1 illustrating the clutch actuating and gear shifting means in its functioning position.

Figure 9 is a horizontal sectional view looking down into the transmission case of an automobile and illustrating a modified form of clutch actuating and gear shifting means.

Figure 10 is a sectional view taken on line 10—10 of Figure 9 further illustrating the modified form of clutch actuating and gear shifting means.

Figure 4:
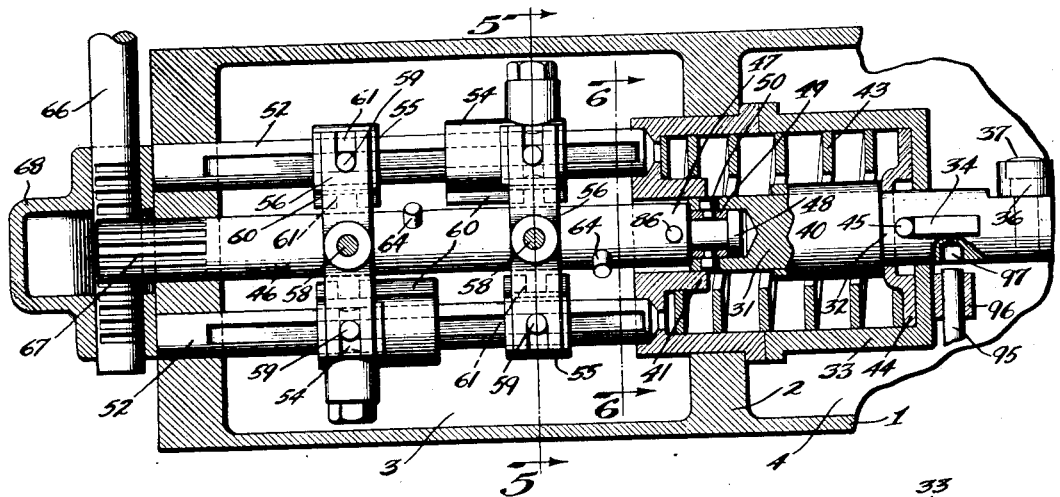
Figure 4 is a horizontal sectional view taken on line 4—4 of Figure 1 and illustrating in detail the gear shifting mechanism.

For purposes of illustration the invention has been shown mounted in that type of transmission case designed for use on automobiles. This type of transmission case extends back from the motor of the automobile and is subdivided into a fly-wheel or clutch compartment and a gear compartment. The clutch mechanism has not been detailed since it can be of any design. The type illustrated has a member slidable inwardly to disengage the clutch members, and the clutch mechanism thereof is mounted within the fly-wheel.

The gear box as illustrated contains the customary arrangement of gears providing for three forward speeds and a reverse. The driven or shiftable gears are shown unmeshed or in their normal inoperative or neutral position, and each is adapted to be translated in either direction to mesh with the proper gear to obtain the desired change of speed or direction of driving. A pneumatic clutch actuating and gear shifting device is shown mounted between the clutch or fly-wheel, and the gear compartment, and the gear shifting elements are disclosed as mounted in the upper portion of the gear box and extending forwardly into the fly-wheel chamber.

Only that portion of the transmission mechanism to which the invention is directly applied has been shown. The transmission case is indicated as 1, and has the division wall 2 forming the gear compartment 3 and the clutch compartment 4. The main drive shaft 5 extends to the rear from the fly-wheel 6 and is located longitudinally of, and approximately centrally of the transmission case.

Within the fly-wheel compartment and secured to the floor 7 thereof is an air motor 8. The air motor consists of a piston 9 disposed within a cylinder 10 and the cylinder 10 opened at the top and having the air inlet 11 at its base. The air inlet 11 is valve controlled and may lead to any source of air pressure. The bore of the cylinder is vertically disposed and movement of the piston is in an upward direction when actuated by air under pressure introduced into the cylinder. A concentric ring 12 is inserted in the base of the cylinder 10, so as to provide a small clearance space or chamber for the air to enter when the piston 9 is in its inoperative or normal position. Lubrication means for the piston is provided at the top of the cylinder in the nature of a concentric felt ring 13, and secured in a groove 14 on the top of the cylinder by means of a flanged concentric ring 15. The groove 14 is of a depth to provide a space for the pocketing of oil above the felt ring, and the lubricant is distributed on the bore wall by the action of the piston passing therethrough. A lubricant supply pipe 16 is connected to the ring 15 and extends to the inside of the gear box.

A lever 17 is secured centrally of the piston and extends upwardly therefrom. The upper end of the lever is secured to an arm 18 of a combined lever and cam member 19. The member 19 is pivoted to the side wall of the transmission case as at 20. The member 19 is pivotally supported by a stud 21 engaged into a boss extending from and integral with the transmission casing wall at a point slightly above the main drive shaft 5. The stud is provided with a nut 22 for mounting the member 19 upon the stud. The lever and cam member 19 has the clutch lever actuating cam portion 23 and a shifter arm 24.

Above the member 19 and pivotally secured to the transmission casing side wall on a stud 25 mounted in a boss extending inwardly from the side wall, is the clutch actuating lever 26. The lever 26 is vertically aligned with the drive shaft center and depends downwardly from its pivot toward the shaft. The lower end of the lever 26 is formed with yoke arms 27 to straddle the shaft 5, the arms engaging a concentric clutch throw-out member 28. The contact of the arms 27 with the concentric clutch member 28 is through teats 27$^a$ formed at the ends of the arms and contacting the face of the clutch member at points at each side of the shaft 5. The member 26 carries a roller 29 mounted by a screw 30 engaging the cam portion 23 of the lever 19. The roller is located in the path of the vertically moving cam portion 23 of the member 19. Movement of the member 19 upwardly swings the lever 26 and moves the clutch to its throw-out position.

The gear shifter rod 31 is translatable in its bearings, and is made in two sections for the purposes of selective gear engagement, one section thereof being non-rotatable, and the other section rotatably mounted.

The inner or non-rotatable portion 32 of the rod 31 is slidably mounted in the heads of a hollow cylinder casing 33 secured in the partition wall 2. The rod 32 is translatable in the casing, but is held against rotation by means of a key 34 engaging a slot in the inner end wall 35 of the cylinder casing 33. The inner end of the rod 32 has a roller 36 secured at the side thereof by means of a fillister head screw 37. This roller 36 is disposed in the path of the shaft lever portion 24 of the member 19 and as the portion 24 strikes the roller, the shaft 32 is translated. It can readily be seen that due to the initial relation of the roller on the lever 26 to the cam portion 23, and due to the relation of the lever portion 24 to the roller 36, the clutch actuation takes place before the translation of the rod 32 occurs. The translation of the shifting rod 32 is limited by means of the engagement of the end of a spacer collar 40 thereon with a boss 41 formed on the inner side of the casing wall. The normal distance between the end of the collar and the abutment 41 is sufficient to permit a gear disengaging or engaging movement of the shaft, and the abutment serves to automatically limit the forward stroke of the air motor.

The casing 33 houses a coiled flat spring 43 disposed about the shaft 32 and which acts to return the shaft to normal position. This spring engages a collar 44 secured against translation by means of a pin 45 extending through the shaft 32. The other end of the spacer collar from that engaging the abutment engages the collar 44. The spring is compressed between the end wall of the casing and the collar 44 as the rod is translated. The rod 32 is maintained in normal position against displacement under the spring tension by the engagement of the pin 45 with the inner wall of the casing 35. The outer or rotatable translatable shaft portion 46 has its respective ends 47, 47$^a$ mounted within the end of the shaft 32 and in the outer end wall of the gear compartment and is translatably connected with the shaft 32. The end 47 of the shaft 46 is counterturned to form a headed portion 48 and a split ring 49 is mounted on the counterturned portion. The counterturned or headed portion 48 of the shaft 46 is engaged into a bore in the end of the rod 32. Pins 50 are inserted radially of the shaft 32 and engage apertures in the split ring 49 to secure the shafts 46 and 32 together for translation as a unit. The connected ends of the shafts are well within the bore in the casing 33 so that the pins 50 are held against displacement by engagement with the surface of the bore. By this structure the shaft 46 is made rotatable in relation to the shaft 32 and at the same time is translatable therewith.

Figure 5:
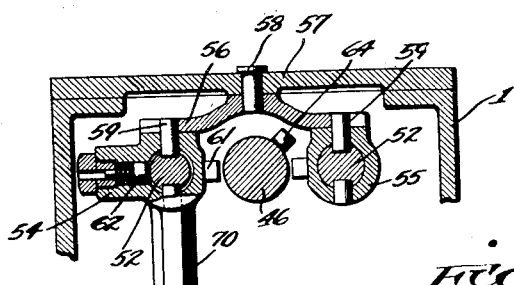
Figure 5 is a sectional view taken on line 5—5 of Figure 4 and illustrating the mounting of the gear shifting yokes.

Two shafts 52 are provided at each side of the translatable shaft 46 and parallel therewith. These shafts 52 are securely mounted against rotation or translation within the end of the casing 33 and the outer end wall of the gear box. A pair of gear shifting yoke members 54 and a pair of auxiliary shifting members 55 are mounted translatable on the shafts 52, and are keyed to the shafts 52 by means of keys engaging longitudinal grooves in the shafts. The two pair of members 54, 55 are normally maintained and substantially in a squared relation with the members of each respective pair diagonally related. Two levers 56 are centrally pivoted to the top cover 57 of the gear box above the shafts by means of pivot pins 58 to provide for a horizontal swinging of the levers. The levers 56 normally stand at right angles to the shafts 46 and each one connects a shifting yoke member 54 and an auxiliary shifting member 55. The ends of the levers 56 are slotted to receive pins 59 extending upwardly from the various shifting members. Extensions 60 are formed on the inner or opposingly related sides of the shifting members and extend toward the shaft 46. Each of these extensions are slotted as at 61 and the slots are aligned in pairs at right angles to the shaft 46 when the shifting members are in neutral position. Spring depressed detents 62 are mounted (see Figure 5) in the pair of gear shifting yoke members 54 and each detent engages a circumferential clutch in its respective shaft 52 to maintain the shaft members in their exact neutral position. Pins 64 are provided on the rotatable shaft 46 and extend radially therefrom. The pins are located on the shaft so that the distance that the shaft is permitted to be translated by the air motor due to the engagement of the end of the collar 40 with the boss 41 of the casing 33, places the pins in position to be swung into engagement within a selected slot 61.

The shaft 46 is rotated by means of a rack bar 66 mounted at right angles to and below said shaft and engaging teeth 67 on the end of the shaft. The rack bar is mounted in a bracket or casing 68 and is actuated from a location convenient to the operator by means of any sort (not shown). The teeth 67 extend far enough to permit the translation of the shaft 46 on the rack bar and sliding of the shaft teeth on the rack.

Figure 7:
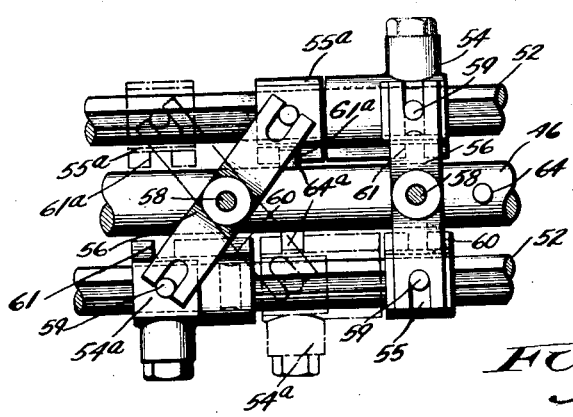
Figure 7 is a view taken the same as Figure 4 but showing the manner in which the gear yokes are shifted.

Four selective positions are provided by the mechanism disclosed herein. This however is purely arbitrary since it can readily be seen that the number can be varied by varying the number of shifting members and pins. Each pin 64 shifts the respective yoke member in either direction (see Figure 7) since it can either be caused to engage a slot on the plain shift member or to engage a slot on the gear shifting yoke member, this depending on the control movement and rotation of the shaft 46. The arrangement of the pins on the shaft is such that only one pin can engage a slot in the same position of the shaft, and the operative positions of the pins are 90 degrees of shaft rotation apart.

The yoke portion 69, 70 of the shifting yoke members extend downwardly and engage respective grooves 71, 72 of the gears 73, 74. The gears 73, 74 are slidable on the splined driven shaft 75. A counter shaft 76 is mounted in the gear box and walls below the driven shaft 75 and carries the speed change gears. A gear 77 secured on this counter shaft is in constant mesh with the gear 79 formed on the end of the main drive shaft 5. A gear 80 is secured on the other end of the counter shaft and is in constant mesh with a reversing gear 81 rotatably secured to the end wall of the gear box. The reversing gear 81 is at the side of, and adapted to be engaged by the shiftable gear 73 for a reversing of the drive. At the other side of the gear 73, when in neutral position, the low speed gear 82 is secured to the counter shaft 76. The other shiftable gear 74 is adapted to be shifted into engagement with a second and intermediate speed gear 83 also secured on the counter shaft or to have its internal teeth 84 engaged with the teeth of the gear 79, and thus connecting directly to the main drive shaft for a high speed drive. The gears on the drive shaft and counter shaft constitute the driving gears and the two shiftable gears, the driven gears.

Figure 6:
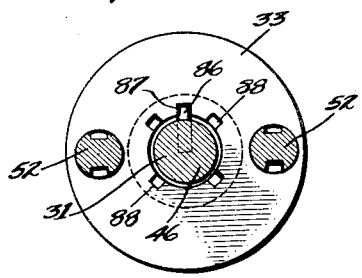
Figure 6 is a sectional view taken on line 6—6 of Figure 4 and showing the arrangement of slots for receiving the shifting pins to prevent disengagement of the gears when the clutch is engaged.

When the clutch is in and the shifting mechanism is in its retracted or normal position, the translatable shaft 46 is maintained in its set or selected position by means of a radially extending pin 86 on the end thereof, engaging one of the series of slots radially arranged from the bore in the end wall of the casing 33 (see Figure 6).

The upper slot 87 or the slot in which the pin 86 is shown is the neutral slot, and the one into which the pin 86 will be returned when the gears 73 and 74 are out of mesh with the driving gears. There are four of the slots 88 arranged 90 degrees apart and designed to maintain the rotatable control shaft 46 in any one of the selecting forward or reverse speeds. The slots 88 are positioned to receive the pin 86 in any one of the selected positions of the shaft 46 as it is returned by the coiled spring in the casing 33, after being rotated to selectively engage the proper pin and notch.

The main drive shaft 5 is mounted on roller bearings 89 carried by a bracket 90 secured to the dividing wall 2 and the main drive gear 79 is formed thereon within the gear box. The end of the main drive shaft is bored to receive the end of the splined driven shaft 75 and roller bearings 92 are provided within the bore as a mounting for the driven shaft. The shaft 75 extends through a bearing bracket 93 mounted in the rear of the transmission and then to the rear axle.

The operation of the device in a shifting manuever for meshing gears is as follows. The operator by means of a control valve causes air under pressure to enter the air control cylinder 10 thereby actuating the piston 9. The clutch is disconnected when the cam portion of the member 19 engages with the roller on the lever 26 and the lever 26 in turn depressing the clutch member 28. After the clutch is disengaged the lever portion of the lever 19 strikes the roller on the end of the gear shifting shaft 31. This causes the spacer collar 40 to engage the abutment 41 and at the same time places the pins 64, 64 in position to be swung into engagement with a slot in a selected shifting member. If for example, the pin 64$^a$ (see Figure 7) is swung by translation of the control or rack bar 66 rotating the shaft 46 through an angle of 45° in an anti-clockwise direction as viewed from the toothing end of the shaft 46, the pin 64$^a$ engages the notch 61$^a$ in an auxiliary shifting member 55$^a$. Now the operator has performed the shift control movement and the actual gear shifting is performed by the action of the coil spring retracting the gear shifting shaft.

Due to the lever 56 being centrally pivoted, the other end from that attached to the member 55$^a$ swings the gear shifting yoke member 54$^a$ in the opposite direction. The slots in the ends of the lever permit of a sliding engagement of the lever end with the pin on the top of the shifting member. If the pin 64$^a$ is swung 135 degrees in a clockwise direction, it will engage the slot in the gear shifting yoke member 54$^a$ and will cause the members to assume the position shown in dot and dash lines (see Figure 7). The first mentioned position of the pin 64$^a$ and subsequent shifting due to the returning of the shifting shaft, causes the shiftable gear 73 to engage with the reverse gear 81 for a reversing of the drive. Upon the return of the gear shifting shaft, the pin 86 will engage the slot 88, which is also 45° from the neutral position slot in an anti-clockwise direction, and the gears will be locked in mesh until the clutch is again disengaged.

The coiled spring in the casing 33 will return the gear shifting shaft immediately upon the operator's release of the air pressure in the air motor. After the return movement of the member 19 created by the spring actuated movement of the gear shifting shaft, the roller on the clutch actuating lever will roll down the inclined approach surface 94 of the cam portion of the member 19, and the clutch will be permitted to become engaged. The clutch shifting cam is designed to give any variable speed of clutch member release, so as to permit a smooth clutch engagement.

The coiled spring gives the desired speed of shifting and permits the gears to mesh softly and without undue force. There can be no shifting of the gears while the clutch is engaged and consequently no forced meshing of fast moving gears, since the disclosed structure positively prevents any such occurrence. The actual gear shifting and clutch movement are performed by power and the control therefore is at the operator's finger tips with merely a valve to be opened and closed, and a control lever to be actuated, all of which manual operation may be done by means of small levers on the steering wheel (not shown).

Means are provided for disengaging the clutch if desired without destroying any set gear relation. A rod 95 is slidably mounted in a bracket 96 secured to the end of the casing 33 and is adapted to be inserted in a radial aperture 97 at the side of the gear shifting rod. This aperture and the rod are normally in alignment, that is, when the clutch is engaged so that the operator can insert the end of the rod 95 at that time by any sort of means (not shown). The insertion of the rod in the aperture prevents actuation of the gear shifting shaft and the lever portion of the member 19 stops against the roller mounted on the end of the gear shifting shaft, thus discontinuing any further forward movement of the air motor.

A modified form of shifting mechanism is disclosed in Figures 9 and 10 of the drawings. The gear shifting mechanism within the gear box and the relation of the drive shaft and clutch mechanism thereto, is the same as that previously described, but in this form the air motor shaft is mounted horizontally. The air motor 100 is secured to the outer face of the side wall 101 of the transmission case and the piston rod 102 of the air motor extends through the side wall and across the casing to the opposite side wall 103 and has its opposite end translatably mounted within the side wall 103. A cap 104 is secured over the bore opening on the outer face of the side wall 103 and houses the projecting end of the rod 102, when said rod is translated.

A cam block 105 is secured by means of a pin to the rod 102 and has its front and rear faces formed into cams, respective clutch actuating 106 and gear shifting 107. The rod is maintained against rotation by means of a key secured in the side wall 103 and slidably engaging a longitudinal groove 108 in the rod 102.

A pair of levers are pivotally secured to the side wall 103 at a point above the bearing of the rod 102, and are adapted to be swung in a horizontal plane. These levers respectively, clutch actuating lever 109 and gear shifting lever 110 have their free ends extending to a points above the block 105 and have rollers 111 secured to the roller side thereof. The rollers 111 engage the respective cam faces of the cam block 105. The clutch actuating lever 109 has a rounded tip 112 engaging the upper end of a pivoted lever 113. This pivoted lever 113 extends downwardly in alignment with the vertical axis of the drive shaft 5 and has an aperture through which the shaft 5 extends. The lever is pivoted as at 114 below the drive shaft for permitting of a pivotal movement of the lever in a vertical direction. Lugs 115 formed integral with the lever, engage the face of the concentric clutch member 28 at each side of the drive shaft. The gear shifting lever 110 has a rounded portion 116 engaging the end of the gear shifting shaft 32. The inclined gear shifting cam surface of the block 105 is considerably steeper than that of the clutch actuating cam surface, since the movement desired is greater. It will be noted that the roller on the gear shifting lever 110 does not engage the inclined cam surface for lever actuating, until the roller of the clutch actuating lever 109 has completed its movement up its respective inclined cam surface and the clutch has been disengaged.

Having described my invention, I claim:

1. A slide gear speed change transmission, including, a clutch controlled power shaft, a clutch therefor, a clutch throw-out lever, a gear shifting rod, a power operated device adapted to move said clutch throw-out lever and translate said gear shifting rod in the named sequence, said gear shifting rod set up by translation for a selective gear shift, a control lever for rotating said rod to connect said rod to the desired gear to be shifted, and means for retracting said rod and shifting said gear.

2. A slide gear speed change transmission, including, a clutch controlled power shaft, a clutch therefor, slide gear shifting mechanism, a power actuated device for setting up said slide gear shifting mechanism in position for a selective gear shifting engagement, a clutch shifting lever adapted to be operated by said power actuated device in advance of the gear setting up movement, a control lever for obtaining said selective gear shifting engagement and means for retracting said shifting mechanism and shifting the selected gear.

3. A slide gear speed change transmission, including, a clutch controlled power shaft, a clutch therefor, slide gear shifting mechanism, a power actuated device for setting up said slide gear shifting mechanism prior to selection of the gear to be shifted, a manually operated control lever for engaging the shifting mechanism with the gear to be shifted, a clutch shifting lever adapted to be actuated by said power actuating device in advance of the setting up of the gear shifting mechanism and a spring for retracting said shifting mechanism and shifting the selected gear.

4. A slide gear speed change transmission, including, a clutch controlled power shaft, a clutch throw-out lever, a gear shifting rod, a double faced cam element, a power device for actuating said cam element, the respective cam faces of the element adapted to engage and operate the clutch throw-out lever and translate the gear shifting rod in the named sequence, a control lever for rotating said shifting rod, a series of yokes slidably mounted adjacent said shifter rod and connected, each to a respective slide gear, a series of pins on said shifting rod, said control lever adapted to rotate a pin on said shifting rod into engagement with a selected yoke, and means for retracting said shifting rod and sliding the engaged yoke.

5. A gear shifting mechanism comprising a series of driving gears, a plurality of shiftable gears engageable with the driving gears, a clutch controlling the power to said driving gears, an air motor, a gear shifting device, a clutch throw-out member, a control member for actuating said clutch throw-out member and shifting device in a timed order, means connecting said control member and air motor, and a selective control for causing said gear shifting device to engage and translate any selected shiftable gear.

6. In combination with a transmission, a driving shaft, a clutch therefor, gears to be meshed, a power source, a cam member connected to and actuated by said power source, a clutch member positioned for activation by said cam member in the first and last phases of the movement of the cam member, a gear shifting element adapted to be activated by intermediate movements of said cam member, a device for causing said shifting element to selectively engage a selected gear, and means for retracting said shifting element for translating and meshing said selected gear with another gear of the train.

7. A slide gear speed change transmission comprising a clutch controlled power shaft, a clutch therefor, a clutch actuating member, a gear shifting mechanism, a common actuator for said clutch actuation member and gear shifting mechanism, a power source connected to said common actuator, a first portion of the actuator adapted to primarily disengage said clutch member, and a second portion adapted to actuate the gear shifting mechanism subsequent to the clutch movement, a manually operated device for selectively causing a gear to be engaged for shifting by the gear shifting mechanism, and means for returning said actuator to shift said gear and to engage said clutch.

8. A slide gear speed change transmission comprising a power shaft, a clutch controlling said shaft, a gear shifting mechanism, a clutch shift member, a double faced cam member, a power device, means connecting said cam member and power device, one of said cam faces adapted to actuate said clutch shift member in the first and last phases of the cycle of movement of said cam member and the second cam face adapted to actuate the gear shifting mechanism in the intermediate phases of the cam member movement, a device for selectively causing a certain slidable gear to be engaged by said gear shifting means, and means for returning said cam member to shift said gear and re-engage said clutch.

9. A shifting device for a slide gear speed change transmission including a clutch controlled power shaft, a clutch therefor, a translatable rotatable gear shift rod, a plurality of shiftable gears, yokes engaging each of said gears and translatably mounted, a series of studs on said shift rod, a power actuated element for operating said clutch and translating said shift rod, a selective control for rotating said shift rod for causing a pin of the series to engage a selected gear yoke when the shift rod has been translated by the power actuated element whereby the selected gear is shifted upon the return of the shift rod.

10. A shifting device for a slide gear speed change transmission, including a shift lever pivoted intermediate of its ends, a slide gear, a gear engaging translatable yoke member attached to one end of said pivoted lever, a translatable shift collar attached to the other end of said pivoted lever, and actuating means for translatably engaging either shift collar or yoke member whereby said gear is shifted in either direction.

11. A shifting device for a slide gear speed change transmission, including, a translatable shift rod, a plurality of shiftable gears, a series of driving gears, a shifter yoke associated with each shiftable gear, said yokes slidable selectively through engagement by the shift rod, power means for translating said shift rod into position for yoke engagement, a control lever for engaging said shift rod with the desired yoke, a spring for retracting said shift rod and shifting said yoke and gear, and means for preventing control lever movement when the rod is in retracted position.

In witness whereof, I hereunto subscribe my name.

PAUL W. NEFF.